United States Patent [19]
Richardson

[11] Patent Number: 5,320,370
[45] Date of Patent: Jun. 14, 1994

[54] SHUTTLECAR EQUALIZER

[75] Inventor: Kevin D. Richardson, Johannesburg, South Africa

[73] Assignee: Eimco Mining Machinery (Proprietary) Limited, Transvaal, South Africa

[21] Appl. No.: 992,462

[22] Filed: Dec. 17, 1992

[30] Foreign Application Priority Data

Dec. 19, 1991 [ZA] South Africa .................. 91/9998

[51] Int. Cl.⁵ .................................................. B60P 3/00
[52] U.S. Cl. ...................................................... 280/111
[58] Field of Search ................... 280/85, 109, 111, 126

[56] References Cited

U.S. PATENT DOCUMENTS 2,705,647  4/1955  Beck ..................................... 280/111
3,497,231  2/1970  Fulmer et al. .................. 280/111 X

FOREIGN PATENT DOCUMENTS 2642 of 1904 United Kingdom ................. 280/111

*Primary Examiner*—David M. Mitchell
*Assistant Examiner*—Andrew C. Pike
*Attorney, Agent, or Firm*—Felfe & Lynch

[57] ABSTRACT

The shuttlecar equalizer has a pair of spaced apart equalizer members each of which is of one-piece construction and each of which includes an operatively centrally pivoted equalizer bar and upstanding ears at each end. A rigid structure extends between and connects the equalizer members to one another. The equalizer members are designed for the connection thereto of wheel end unit support structures which form part of the wheel end units themselves and which locate in use between the ears of the equalizer members.

11 Claims, 5 Drawing Sheets

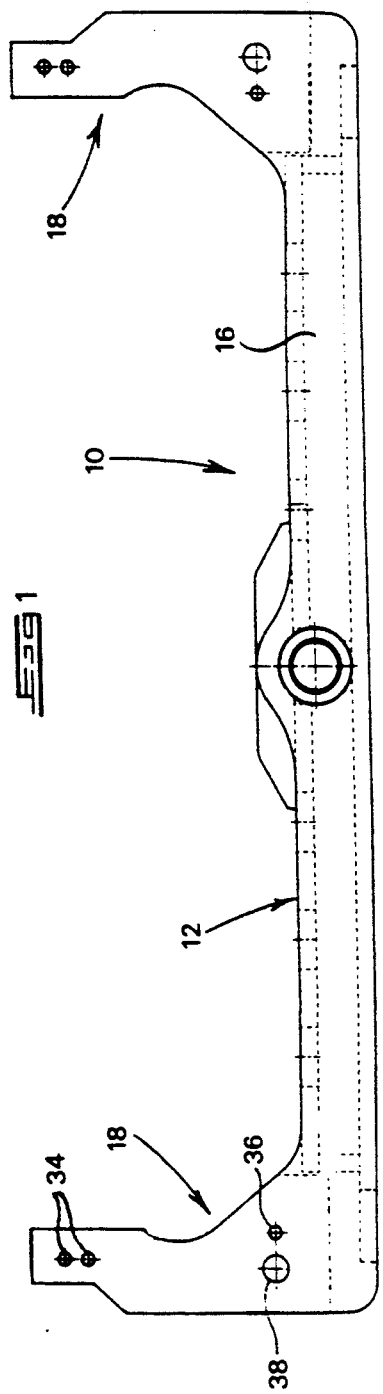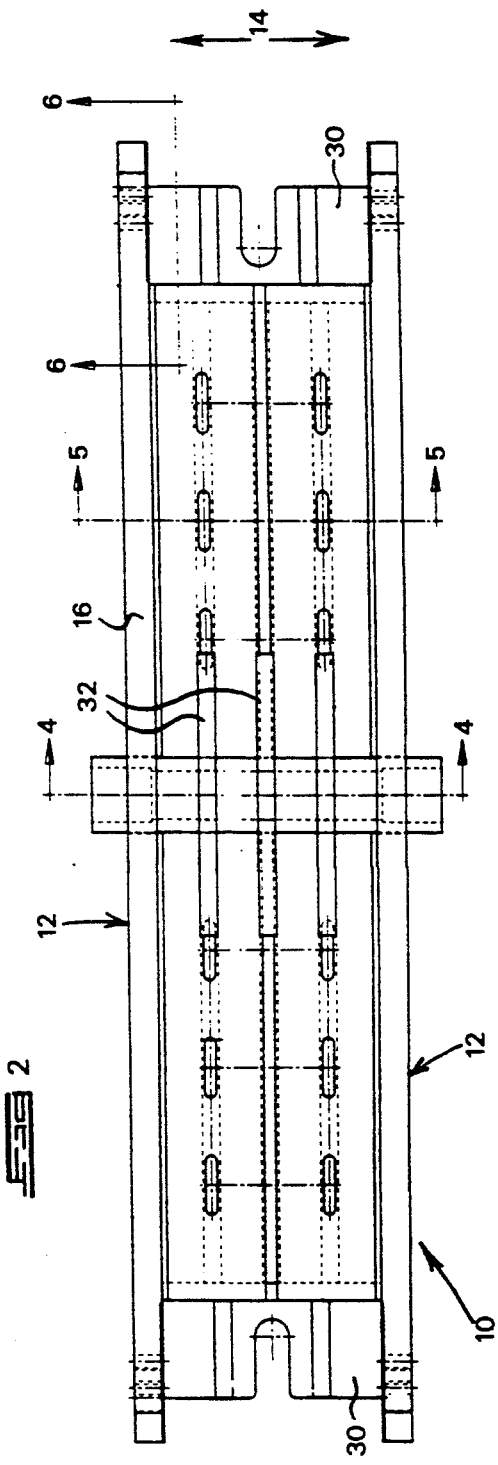

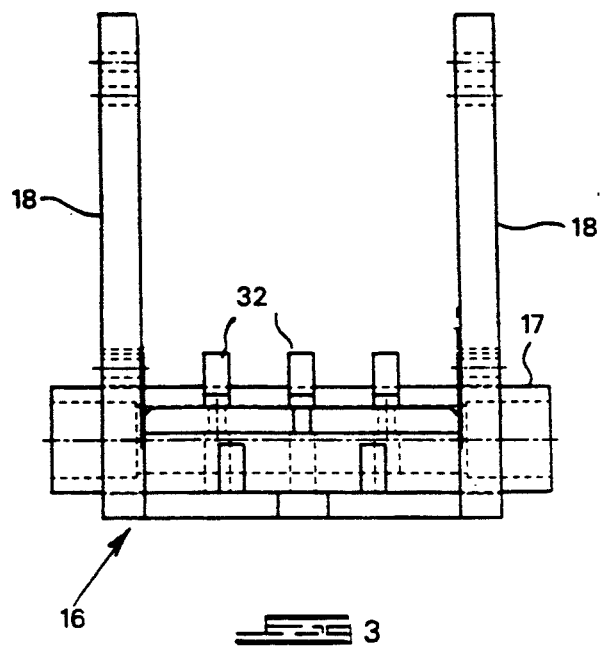
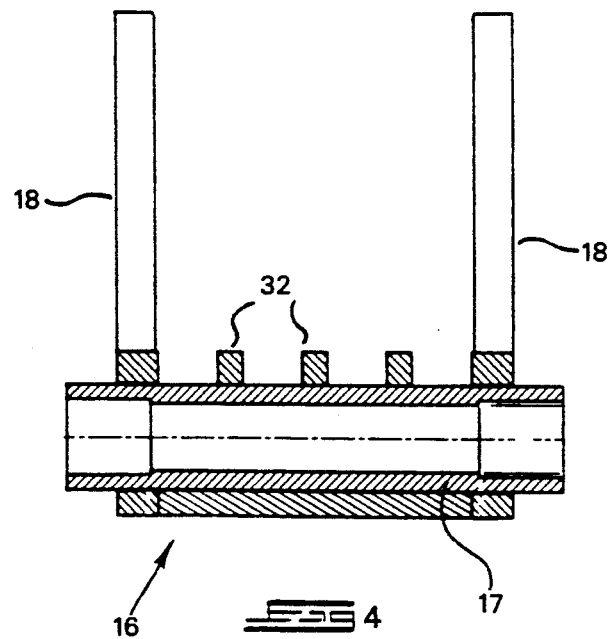

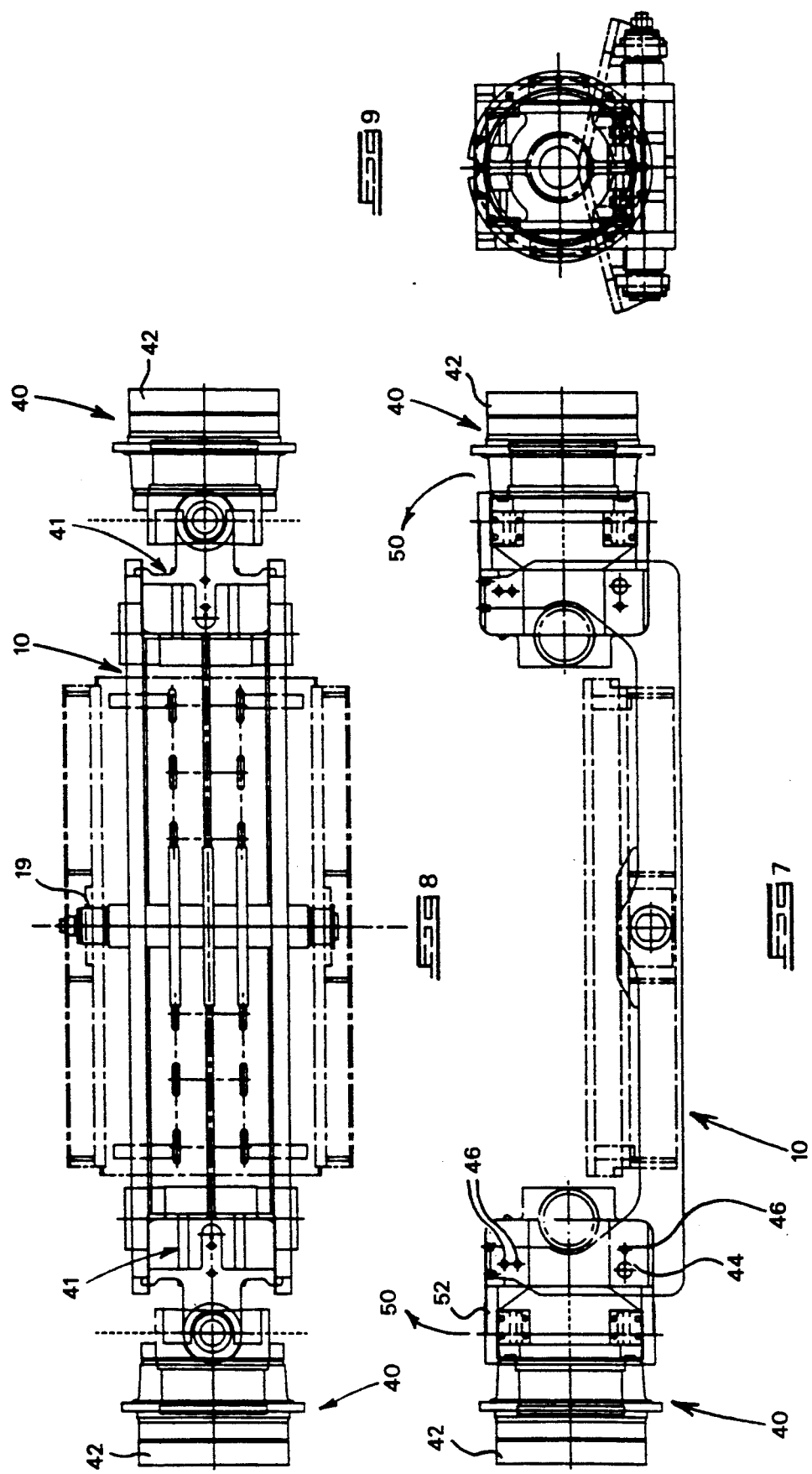

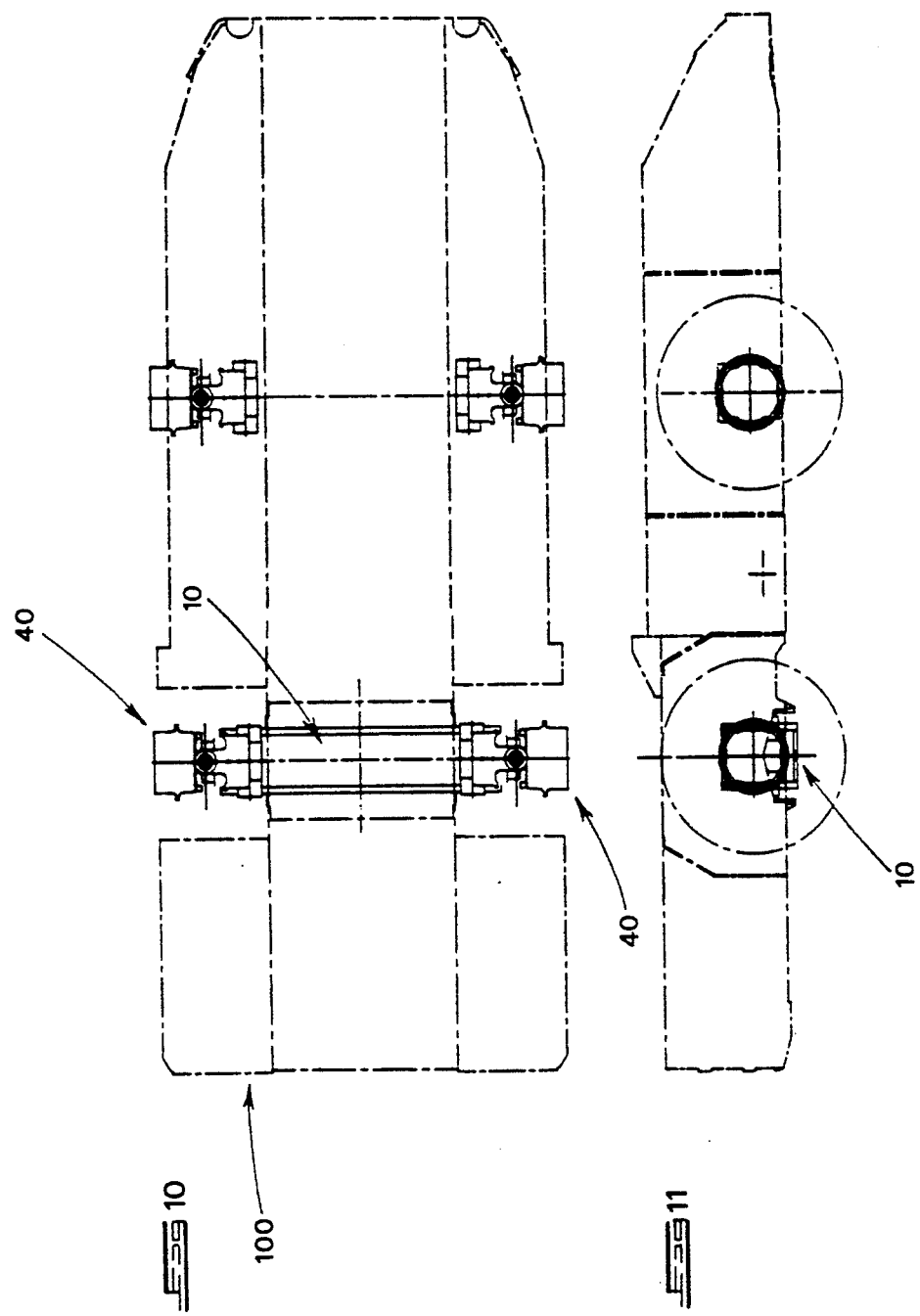

SHUTTLECAR EQUALIZER

BACKGROUND TO THE INVENTION

This invention relates to a shuttlecar equaliser for use on shuttlecars as used in mining, and particularly coal mining, operations.

In coal mining operations where shuttlecars are obliged to traverse rough and uneven terrain, equalisers are used to balance the wheel loads and to maintain the wheels of different wheelsets in contact with the ground while permitting the different wheelsets to rock relative to one another about a fore and aft axis. In practice, an equaliser spans transversely and carries a wheel end unit at each end. At its centre, the equaliser is mounted pivotally to the chassis of the vehicle about a horizontal, fore and aft axis, and it is this pivotal connection which permits relative rocking between different wheelsets on the shuttlecar.

In the conventional design of shuttlecar equaliser, the wheel end units of each wheelset are mounted outboard of the respective ends of the equaliser bar. This is not an optimum design because, in a typical shuttlecar, limited clearance only is left behind the wheel end unit for the equalizer attachment. Added to this, the wheel end units are usually mounted on so-called "ears" which are manufactured as separate castings that are then welded to the equaliser bar proper. This mode of construction is prone to failure at the weld sites.

SUMMARY OF THE INVENTION

According to a first aspect of the present invention there is provided a shuttlecar equaliser comprising a pair of spaced apart equaliser members each of which is of one-piece construction and each of which includes an operatively centrally pivoted equaliser bar and upstanding ears at each end of the equaliser bar, and a rigid structure extending between and connecting the equaliser members to one another, the equaliser members being adapted for the connection thereto of wheel end unit support structures which locate in use between the ears of the equaliser members.

Ideally, the equaliser members are formed in one piece of steel plate. In the preferred design, each equaliser member is generally U-shaped with the equaliser bar forming the base of the U-shape and the ears forming the legs of the U-shape.

The equaliser members can be connected to one another by a rigid structure comprising upper and lower, generally horizontal plates and generally vertical plates extending between and connected to the upper and lower plates.

A second aspect of the invention provides a shuttlecar which includes an equaliser as summarised above. In the preferred shuttlecar, wheel end unit support structures are located between the ears of the equaliser and are connected to the ears by shear pins and bolts which pass through the ears.

BRIEF DESCRIPTION OF THE DRAWINGS

The invention will now be described in more detail, by way of example only, with reference to the accompanying drawings in which:

FIG. 1 shows a front elevational view of an equaliser of the invention;

FIG. 2 shows a plan view of the equaliser;

FIG. 3 shows an end view of the equaliser;

FIG. 4 shows a cross-section at the line 4—4 in FIG. 2;

FIGS. 7, 8 and 9 show views corresponding to those seen in FIGS. 1 to 3, but with the wheel end units connected to the equaliser; and FIGS. 10 and 11 respectively show diagrammatic plan and side views of a shuttlecar fitted with the equaliser illustrated in the preceding Figures.

DESCRIPTION OF AN EMBODIMENT

Figure 5:
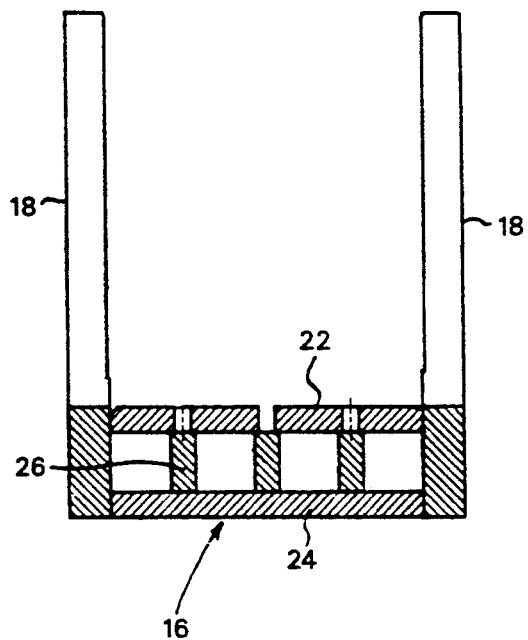
FIG. 5 shows a cross-section at the line 5—5 in FIG. 2.
Figure 6:
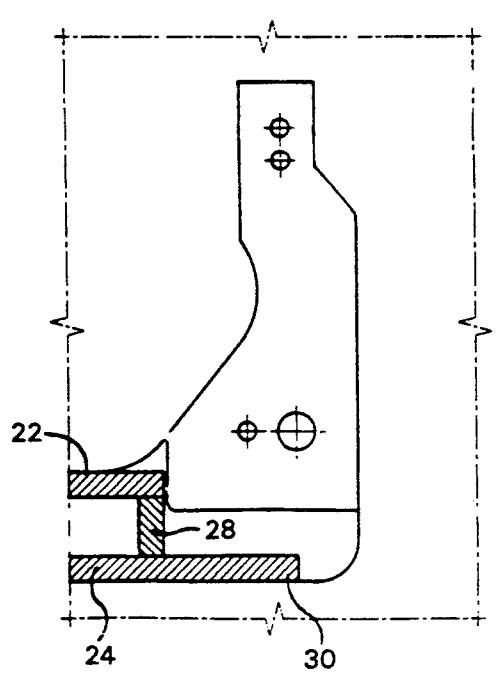
FIG. 6 shows a partial cross-section at the line 6—6 in FIG. 2.

The illustrated equaliser, indicated generally with the numeral 10, includes a pair of equaliser members 12 which are spaced apart from one another in the fore and aft direction of a coal shuttlecar 100 (FIGS. 10 and 11). The fore and aft direction is indicated in FIG. 2 with the numeral 14 and will be readily recognised in FIGS. 10 and 11.

Each equaliser member 12 is formed in one piece from steel plate, and provides an elongate equaliser bar 16 and a pair of upstanding equaliser ears 18 having the shape seen in FIG. 1. It will be noted that the equaliser member 12 has generally a U-shape with the equaliser bar 16 forming the base of the U-shape and the upstanding ears 18 the legs of the U-shape.

The equaliser bars 16 are centrally holed to take a fore and aft extending tubular steel member 17 through which, in use, passes a central pivot shaft 19 seen in FIG. 8 and indicated diagrammatically in FIGS. 10 and 11.

The equaliser members 12 are connected to one another by means of a fabricated structure that includes upper and lower horizontal plates 22 and 24, vertical plates 26 between the plates 22 and 24, vertical end plates 28 and horizontal end plates 30. In the region of the central tubular steel member 17, where the greatest compressive bending stresses can be expected to arise in operation, the upper plate 22 is reinforced by upstanding plates 32.

Although not illustrated in the drawings, it will be appreciated that the connections between the equaliser members and the various components of the fabricated structure are welded connections.

The upper and lower ends of the equaliser ears 18 are pierced by holes 34 and 36. Further holes 38 are formed next to the holes 36.

FIGS. 7 to 9 illustrate the equaliser of the earlier Figures once wheel end units 40 have been connected in place. The wheel end units 40 include support structures 41 that incorporate independent right angle drives for the wheel hubs 42. The nature and operation of the right angle drive units form no part of the present application, but are described in detail in a copending patent application filed Dec. 17, 1993, Ser. No. 07/992,453 under the title "Shuttlecar Wheel End" and the contents of which are incorporated herein by reference.

It will be noted, particularly from FIG. 8, that the support structures 41 of the wheel end units 40 are connected to the ends of the equaliser at positions between the equaliser members 12. Connection is achieved by shear pins 44 and supporting bolts 46. The shear pins pass through the holes 38 and through the wheel end unit support structures 41. The supporting bolts 46 pass through the holes 34 and 36 and are engaged with the wheel end unit support structures 41.

In operation, with the weight of the shuttlecar taken by the wheels mounted on the hubs 42, the shear pins 44 take the major part of the vertical shear force imposed on the wheel end unit connections.

Added to this, the lateral off-set of the wheels relative to the ends of the equalizer generates force couples that act in the directions indicated in FIG. 7 by the arrows 50. At each end of the equalizer, the force couple is taken by the pin 44, acting in shear, and by compression applied to the upper extremity of the equalizer ear 18 by an upper part 52 of the wheel end unit structure.

It will be appreciated that the supporting bolts 46, which effectively connect the equaliser ears 18 to the wheel end unit support structures 41, serve, in addition to their connecting function, to support and bolster the ears.

The equaliser described above has some important advantages over equalizers of conventional design. For instance, with equalizer members formed in one piece from steel plate, it is anticipated that these members will be less prone to failure than with the conventional system that employs separate castings to which the wheel end units are connected and which are themselves welded to the ends of the equaliser bar. A further advantage arises by virtue of the location of the wheel end support structures 41 between the ears of the equalizer members, since this reduces the demand on the already limited space between the wheel end and the body of the shuttlecar 100.

I claim

1. A shuttle car equalizer comprising a pair of spaced apart equalizer members each of which is of one-piece construction and each of which includes an operatively centrally pivoted equalizer bar and upstanding ears at each end of the equalizer bar, and a rigid structure extending between and connecting the equalizer members to one another, the equalizer members being adapted for the connection thereto of wheel end unit support structures which locate in use between the ears of the equalizer members, said rigid structure comprising upper and lower, generally horizontal plates and generally vertical plates extending between and connected to the upper and lower plates.

2. A shuttlecar comprising:
   a shuttlecar body structure;
   an equalizer structure supporting said body structure, said equalizer structure comprising first and second equalizer members extending laterally of the shuttlecar and spaced longitudinally from each other,
   each of said equalizer members comprising a middle portion pivotally connected with the body structure and two opposing lateral end portions fixedly connected with said middle portions;
   a first shear support member supported on one of the lateral end portions of the first equalizer member and on one of the lateral end portions of the second equalizer member and extending generally longitudinally therebetween, and
   a second shear support member supported on the other of the lateral end portions of the first equalizer member and the other of the lateral end portions of the second equalizer member and extending generally longitudinally therebetween,
   first and second wheel support structures each supported between said equalizer members on a respective shear support member,
   said wheel support structures and said lateral end portions each having co-acting engagement portions engaging each other and bearing loads from the wheel support structure, the engagement portion of the lateral end portion being rigidly supported on said equalizer structure generally vertically spaced from the associated shear support member, said shear support members transmitting loads in shear from said wheel support structures to said equalizer structure.

3. A shuttlecar according to claim 2 wherein the equalizer members are formed in one piece of steel plate.

4. A shuttle car according to claim 2 wherein each equalizer member is generally U-shaped with the middle portion forming the base of the U-shape and the lateral end portion including ears extending generally upwardly from the middle portion and forming the legs of the U-shape.

5. The invention according to claim 2 and said middle portions of said equalizer members being formed integrally with the lateral end portions thereof.

6. The invention according to claim 2 and said lateral end portions of each of said equalizer members extending upwardly from the respective middle portions and giving each of said equalizer members a generally U-shaped configuration.

7. The invention according to claim 6 and said lateral end portions having apertures therein and said shear support members comprising shear pin means supported in said apertures in the associated lateral end portions.

8. The invention according to claim 7 and the lateral end portion having an upper terminal end portion, and each of said engagement portions comprising an abutment portion on the upper terminal end portion of the associated lateral end portion.

9. The invention according to claim 2 and fastening means securing said wheel support structures between said lateral end portions.

10. The invention according to claim 9 and said lateral end portion having openings therein, and said fastening means comprising bolts extending generally longitudinally through said openings and engaging said wheel support structures.

11. The invention according to claim 2 and said middle portions and said lateral end portions defining a generally upwardly disposed space therebetween, said body structure being supported in said space.

* * * * *